UNITED STATES PATENT OFFICE.

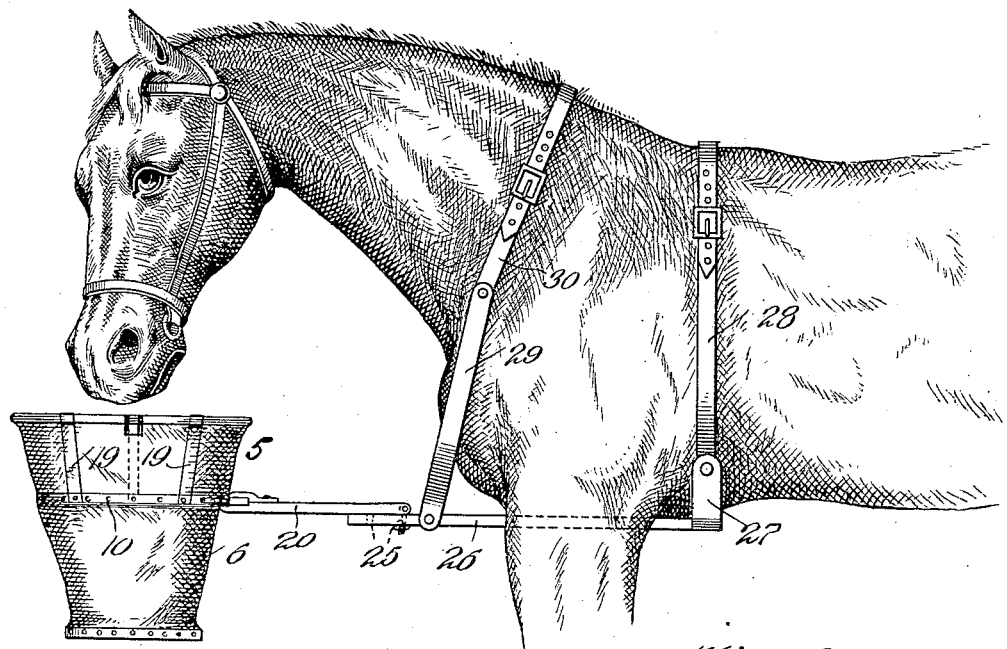
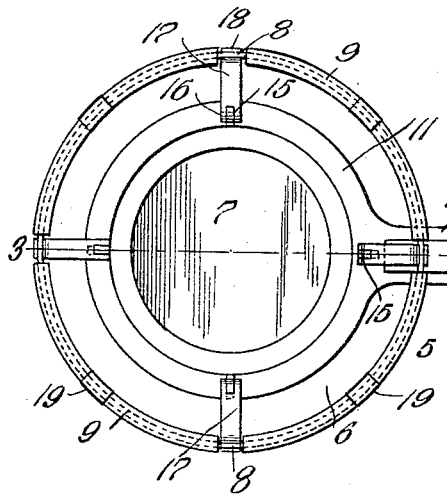
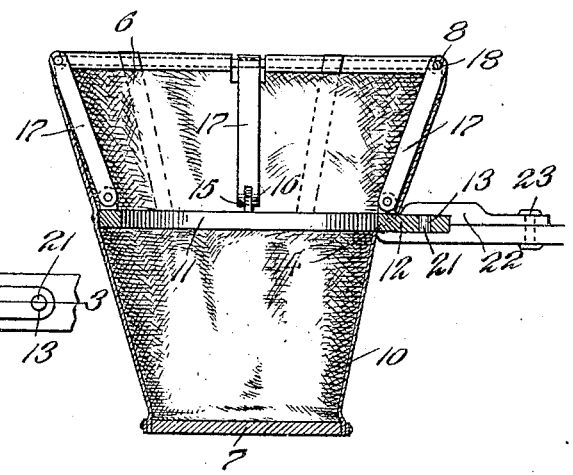

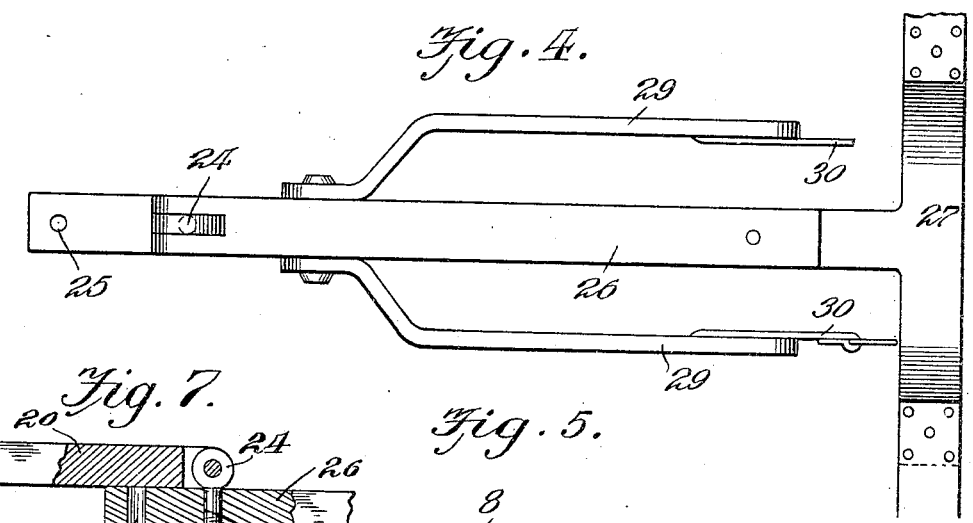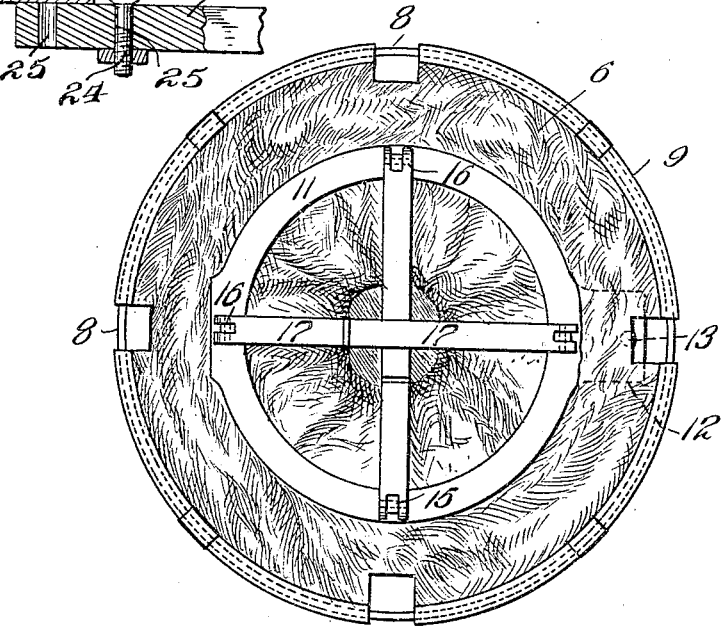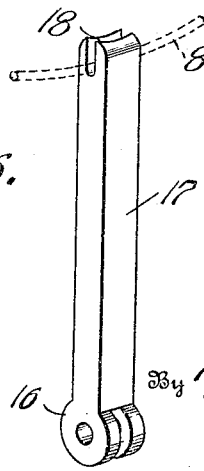

JOSEPH C. SNYDER, OF McILHANEY, PENNSYLVANIA.

HORSE-FEEDER.

955,005. Specification of Letters Patent. Patented Apr. 12, 1910.

Application filed August 5, 1908. Serial No. 447,095.

*To all whom it may concern:*

Be it known that I, JOSEPH C. SNYDER, a citizen of the United States, residing at McIlhaney, in the county of Monroe and State of Pennsylvania, have invented new and useful Improvements in Horse-Feeders, of which the following is a specification.

This invention relates to the class of care of live stock, and more particularly to horse feeders, and has for an object to provide a device of this character which may be readily and conveniently attached to an animal and held normally with its upper opened end in spaced relation to the mouth of the animal, thus allowing perfect freedom of the head of the animal and preventing tilting movement of the feed container to obviate the loss of food therefrom.

A further object of this invention is to provide a device of the character set forth above which may be conveniently folded when not in use to occupy but little floor space.

With these and other ends in view which will appear as the nature of the invention is better understood, the same consists in the improved construction and novel arrangement and combination of parts which will be hereinafter fully described and particularly pointed out in the claim.

In the accompanying drawings have been illustrated a simple and preferred form of the invention; it being, however, understood that no limitation is necessarily made to the precise details therein exhibited, but that changes, alterations and modifications within the scope of the invention may be resorted to when desirable.

In the drawing, Figure 1 is a side view of a horse showing the application of the present invention thereto, Fig. 2 is a detailed top plan view, Fig. 3 is a longitudinal sectional view on the line 3—3 of Fig. 2. Fig. 4 is a top plan view of portions of the device in a folded position, Fig. 5 is a top plan view of the receptacle in its folded position. Fig. 6 is a perspective view of one of the arms. Fig. 7 is a detail section showing the manner for adjustably connecting the arms with each other.

Referring now more particularly to the drawings there is shown a feeder 5 comprising a receptacle 6 formed preferably of fabric material and having an enlarged open upper end and a reduced or contracted bottom as shown. The contracted bottom is provided with a base member 7 which is preferably of circular form. At the top, the bars of the receptacle have secured thereto an annular member 8 which in the present instance is shown as formed from a single length of wire and which is preferably confined in a hem 9 formed at the upper end of the receptacle.

Midway between the ends of the receptacle and secured thereto by fastening devices 10 there is shown an annular member 11 which is provided with an inwardly directed lug or offset portion 12 in which is formed a vertically disposed opening 13 for a purpose to be hereinafter described. The offset portion 12 projects through a passage 14 formed in one side of said receptacle. The annular member 11 is provided with a plurality of vertically disposed ears 15 for receiving the forked lower ends 16 of arms 17, said forked ends being pivotally mounted to said ears, as shown. The arms 17, at their upper ends, are provided with annular channels 18 adapted for engagement with the member 8 and to hold the same in spaced relation to the member 11 when the device is in use. Elastic strips 19 have their upper ends connected to the member 8, and the lower ends of these strips are secured in a suitable manner to the member 11, and effectively serve as means to prevent casual displacement of the member 8 from the annular channels at the upper ends of the arms 17 when the receptacle is in an operative position.

An arm 20 is located rearwardly of the receptacle, and at its forward end carries a vertically disposed pin 21 for engagement in the passage 13 formed in the offset portion 12 of the member 11, which pin is adapted, when in its operative position to lie flush with the upper surface of the portion 12, and is covered and held against displacement by means of a latch member 22 pivotally mounted as indicated at 23 to the arm 20. The arm 20 is provided at the rear end thereof with a pivotally mounted ear 24, which ear carries a depending pin or stud 24′ adjustably engaged in passages 25 formed in a second arm 26. The stud 24 is principally threaded, as shown, to receive the adjusting nut which latter is employed to hold the stem against accidental displacement under the weight of the arm 20. The arm 26, when in use, is disposed between the fore legs of an animal as illustrated in Fig. 1 of the drawings, and carries at its rear end a curved element 27 for engagement beneath the breast of the animal and which has connected thereto the ends of the breast strap 28. Adjacent to the forward end of the arm 26, and pivotally connected thereto is shown a pair of crotch members 29, and these members have secured thereto the ends of a neck strap 30 as shown.

From the construction set forth, it is obvious that a cheap and simple device is constructed which may be manufactured and put upon the market and purchased by the ordinary class of live stock owners. The construction of the device is such that it may be conveniently folded when not in use, and it will be understood that by the provision of the latch member 22 it may be disengaged from the offset portion 12 of the member 11 to permit of the detachment of the receptacle from the arm 20. The construction of the arms 20 and 26 respectively is such that they may be folded to lie upon each other in parallel relation and it will be seen that the arms 29 may also be moved to assume a common plane with respect to the arms 23.

Having thus described the invention, what is claimed as new, is:—

In a device of the class described, a receptacle comprising a collapsible body having an enlarged upper open end and a reduced lower end, a base member secured to the lower end of the receptacle to close the same, an annular member located interiorly of the receptacle and disposed immediately between the upper and lower ends thereof, said annular member being formed with an offset portion which projects through the receptacle, a second annular member secured to the upper end of the receptacle, a plurality of pivoted members upon the first named annular member and provided with forked outer end portions which are adapted to receive the second annular member to hold the portion of the receptacle above the first annular member in an extended position, strips of elastic material secured at their lower ends to the first annular member and at their upper ends to the second annular member to hold the latter operatively positioned in the forked outer ends of the said pivoted members, foldable arms removably connected with the offset portion of the first named annular member, and supporting straps operatively engaged with one of the said arms, said arms being adapted when folded to lie in a parallel plane with each other and to lie substantially in a plane with the receptacle when the latter is in its folded position.

In testimony whereof I affix my signature in presence of two witnesses.

JOSEPH C. SNYDER.

Witnesses:
 E. T. KUNKLE,
 D. M. HANEY.